Patented Oct. 4, 1949

2,483,836

UNITED STATES PATENT OFFICE 2,483,836

EMULSION PRODUCT AND PROCESS OF MAKING

Paul E. McCoy, San Francisco, Calif., assignor, by mesne assignments, to Stancal Asphalt & Bitumuls Company, San Francisco, Calif., a corporation of Delaware No Drawing. Application January 6, 1947, Serial No. 720,477

14 Claims. (Cl. 106—83)

This invention relates to oil-in-water type emulsions of thermoplastic organic materials, and to paints and coating compositions made therefrom.

Oil-in-water type emulsions of thermoplastic organic materials have been widely used for coating structural materials, such as metal, stone, builders' felt and concrete.

However, such coatings often possess certain deficiencies, among which are the following: inadequate resistance to heat, weathering and the corrosive action of moist atmospheres; inadequate viscosity and mechanical strength; poor sprayability; failure to adhere tenaciously to metals.

The attempts to overcome all of such defects by incorporating in the emulsions various compounds and fillers such as asbestos, vermiculite, diatomaceous earth, etc. have not been wholly successful.

It is an object of this invention to improve upon emulsions of thermoplastic organic materials.

It is a further object of the invention to improve upon coating materials prepared from such emulsions.

It is a particular object of the invention to provide emulsions of thermoplastic organic materials, having physical properties suiting them for use as coating compositions.

It is a further particular object of the invention to provide thermoplastic organic emulsion paints which adhere tenaciously to metal, protect metals from rusting and which are resistant to heat and to weathering.

These and other objects of the invention will be apparent from the ensuing description and the appended claims.

By the term "thermoplastic organic material," as used in this specification and the appended claims, I mean those organic, water-insoluble, emulsifiable, heat-softenable and moldable substances commonly comprehended by such term, such as bitumens, e. g., asphalt, coal tar, coal tar pitch, paraffin wax, stearine pitch; and ester gum, natural resins, thermoplastic synthetic resins, etc. Typical of the emulsifiable, thermoplastic synthetic resins which I may use are: alkyd, acrylic, styrene, vinyl, polybutene, chlorinated rubber, and the like. The preparation of oil-in-water type emulsions of synthetic resins is described in Mason and Manning, The Technology of Plastics and Resins, D. Van Nostrand Company, Inc., New York, 1945. When asphalt is the dispersed or emulsified material it may be natural asphalt or petroleum asphalt, steam refined, air-blown or solvent extracted. The asphalts may have a wide range of penetration and melting point, including zero to 350 penetration (A. S. T. M. Method) and 90–175° F. melting point (ring and ball method).

The emulsions which are treated in accordance with the invention can be prepared by methods well known in the art, and are exemplified by the methods of preparing bituminous emulsions described in McKesson U. S. Patent No. 2,074,731; Buckley 2,256,886; Watts and McCoy 2,332,542 and Cole and Buckley 2,336,468. Also, clay-type emulsions such as described in Kirschbraun U. S. Patent No. 1,302,810 may be used. The emulsions are preferably of mixing grade; that is, sufficiently stable to allow mixing with fine mineral aggregates without breakdown. Emulsions capable of passing the A. S. T. M. cement mixing test (D244–42) are best suited for the purposes of the invention. Emulsion residues of 50 to 70%, most advantageously 55 to 65%, are preferred. Other thermoplastic, water-insoluble organic materials, such as paraffin wax, coal tar, coal tar pitch, stearine pitch, ester gum and synthetic resins may be substituted for or blended with the asphalt, but asphalt is preferred.

In accordance with the herein invention, two compounds are incorporated in the emulsion of the class described, or in a paint, coating composition or other product containing such an emulsion: (1) a water-soluble, polyvalent metal fluosilicate and (2) a water-soluble salt which, through double decomposition with a water-soluble, polyvalent metal fluosilicate, yields substantially water-insoluble end products. For the purposes of my invention, a salt which has a water-solubility less than one part in 100 parts of water at 20° C. is considered substantially water-insoluble.

For instance, I may incorporate in the emulsion product magnesium fluosilicate as the water-soluble, polyvalent metal fluosilicate and sodium silicate as the water-soluble salt which, through double decomposition with a water-soluble polyvalent metal fluosilicate, yields substantially water-insoluble end products. In this instance, the water-insoluble double-decomposition products are sodium fluosilicate and magnesium silicate. The double decomposition may be shown as follows:

$$MgSiF_6 + Na_2SiO_3 \rightarrow Na_2SiF_6 + MgSiO_3$$

Among the water-soluble polyvalent metal fluosilicates, all of which are operable as herein described, are the following fluosilicates: cadmium, cobalt, cupric, hydrazine, iron, lead, lithium, magnesium, nickel, silver, strontium, thallium and zinc.

In the specific example mentioned above, sodium silicate was the companion salt used with the water-soluble polyvalent metal fluosilicate. Sodium silicate is preferred. However, as explained, I may use any water-soluble salt which, through double decomposition with a water-soluble polyvalent metal fluosilicate, yields substantially water-insoluble end products. For example, I may use alkali metal phosphates, alkali metal carbonates, alkali metal oxalates, alkali metal aluminates, alkali metal arsenates, alkali metal ammonium arsenates, alkali metal borates and fluorides, alkali metal ammonium phosphates.

Preferably separate aqueous solutions of the two compounds are prepared and such solutions are then added in separate streams to the preformed oil-in-water type emulsion product which may or may not contain admixed fillers. It is preferred not to incorporate the two solutions simultaneously. If the two solutions are added to the emulsion simultaneously, it is preferred to add them at points as widely spaced as possible. In any event, it is desirable that the emulsion product be continuously agitated during the addition in order to insure homogeneous mixture and to insure that the resultant double decompositions occur uniformly throughout and that the formation of the water-insoluble double-decomposition products enjoy maximum dispersion. Since the emulsion has an aqueous continuous phase, the aqueous solutions may be readily incorporated in the emulsion. When the aqueous solutions are incorporated in the oil-in-water type emulsion, with agitation of the emulsion, double decomposition of the two water-soluble salts occurs, with the resultant formation of substantially water-insoluble compounds. It is the presence of such water-insoluble double-decomposition products, incorporated in the manner described, which is effective in bringing about the novel and useful properties of the invention. The water-insoluble double-decomposition products, incorporated in the manner described, are widely and homogeneously dispersed throughout the emulsion. When incorporating the water-soluble salts, I have found that best results are obtained if the water-soluble polyvalent metal fluosilicate is added after the companion salt has first been added. Also, when fillers are added to the emulsion, best results are obtained if the fillers are added before the above mentioned salts are added.

The benefits of my invention will not be obtained if the water-insoluble double-decomposition products are formed outside the emulsion and then incorporated in the emulsion, as by pre-mixing the solutions of the two water-soluble salts, prior to incorporation in the emulsion. To obtain the benefits of my invention, the water-insoluble, double-decomposition products must be formed in situ in the emulsion.

The concentration of the aqueous solutions of the water-soluble salts to be incorporated in the emulsion may be varied widely in accordance with the water-solubility of such salts and the amount of double-decomposition products desired to be incorporated. Usually, I prefer to employ the water-soluble polyvalent metal fluosilicates in concentrations of about 2–20% and the water-soluble salts which, through double decomposition with the said fluosilicates, yield substantially water-insoluble end products, in concentrations of about 10–50%. However, each of the aforementioned salts may be used in concentrations as low as 1% and as high as the limit of their water-solubility.

It is preferred to add the water-soluble fluosilicate and the companion salt in equimolar proportions, because when so added the reaction products are completely water-insoluble. If the two salts are not added in equimolar proportions, the emulsion product will contain some water-soluble compounds with the result that when the emulsion coating dries and is subsequently exposed to water a certain amount of leaching out or effloresing occurs. However, when the coating is used under circumstances such that the coating will not be exposed for any considerable period to water, a large excess of either may be used; e. g., one mol of the fluosilicate per ½–1½ mols of the companion water-soluble salt. Likewise, the total quantity of each salt added to the emulsion product may vary within wide limits; e. g., 0.2–20% of the water-soluble fluosilicate and 0.1–12% of the companion salt, with each of the percentages based on weight of the finished product.

Any of the various fillers may be used in my coating product; e. g., diatomaceous earth, asbestos, vermiculite, charcoal dust, fibrated talc, slate dust, stone dust, mica, pigments, biotite, cork, barites, etc. Though I prefer to use fillers which lend themselves to the manufacture of sprayable coatings, such as the above-mentioned fillers, I may also use the various non-sprayable or difficultly sprayable fillers such as glass wool, slag wool, coconut fibres, hair, etc. Though my invention is not confined to the manufacture of coatings containing fillers, it nevertheless has special utility in connection with filled coatings.

The following specific example will further serve to illustrate the practice and advantages of the invention:

*Example.*—13.4 parts finely ground vermiculite, one part of diatomaceous earth, one part of short fiber asbestos and 3.5 parts of iron oxide were mixed with 23.5 parts of water and then with 42.7 parts of asphalt emulsion. The emulsion was a 55% residue, mixing grade emulsion of California asphalt, stabilized by means of a solvent extracted pinewood resin, more particularly described in Buckley U. S. Patent No. 2,256,886. To the mixture were added, first, 13.4 parts of an aqueous solution of sodium silicate (formed from 12.7 parts of water and 0.7 part of commercial sodium silicate, being 38% $Na_2SiO_3$), and then 1.5 parts of a 33% aqueous solution of magnesium fluosilicate. At each stage of the blending procedure, the mixture was stirred. All parts are by weight.

The emulsion coatings in which the subject salts had been incorporated in the manner described were found to be non-tacky, to possess highly improved properties of workability, mechanical strength, rust-prevention and the capacity to adhere firmly to metals and to resist deterioration and slippage when subjected to heat. Galvanized iron coated with emulsion paint so prepared retained its coating without any apparent deterioration of the coating even after long extended exposure to the elements on outdoor weathering racks. Black iron panels coated with emulsion paint so prepared were placed in ovens and maintained at a temperature of 350° F. for seven days, together with panels coated with the same emulsion in which the subject salts had not been incorporated. At the end of the heating period, the coats of untreated emulsion were brittle and easily flaked off, whereas the coatings of the treated emulsion were tough, hard and securely attached to the metal. Steam boiler flue doors were painted with the treated emulsion and over a period of many months the coatings thereon have shown no deterioration.

The method described herein and the emulsion products so prepared have not heretofore been disclosed and are to be sharply distinguished from products and processes such as those described in Patent 2,033,657 to Smith and Patent 2,042,038 to Colmar, involving the use of various fluosilicates and fluorides.

I claim:

1. In the process of making a flowable, stable, storable, non-tacky, weather-resistant coating composition, the steps comprising forming an oil-in-water type emulsion having water as its continuous phase and having as its dispersed phase 50-70% of its weight of a water-insoluble, water-dispersible, organic, thermoplastic material, incorporating in said emulsion, based on the total weight of the coating composition, 0.2-20% of a polyvalent metal fluosilicate, having a solubility in water at 20° C. greater than about 1.0%, and 1.0-12% of a water-soluble alkali metal inorganic salt of the type which reacts in aqueous solution with a water-soluble polyvalent metal fluosilicate to form a water-insoluble alkali metal fluosilicate and a water-insoluble polyvalent metal salt, and forming said water-insoluble alkali metal fluosilicate and water-insoluble polyvalent metal salt in situ in said coating composition.

2. The process of claim 1 wherein the polyvalent metal fluosilicate is magnesium fluosilicate.

3. The process of claim 1 wherein the dispersed phase of the emulsion is asphalt.

4. The process of claim 1 wherein the polyvalent metal fluosilicate is magnesium fluosilicate and the dispersed phase of the emulsion is asphalt.

5. In the process of making a flowable, stable, storable, non-tacky, weather-resistant coating composition, the steps comprising forming an oil-in-water type emulsion having water as its continuous phase and having as its dispersed phase 50-70% of its weight of a water-insoluble, water-dispersible, organic, thermoplastic material, incorporating in said emulsion a filler and, based on the total weight of the coating composition, 0.2-20% of a polyvalent metal fluosilicate, having a solubility in water at 20° C. greater than about 1.0%, and 1.0-12% of a water-soluble alkali metal inorganic salt of the type which reacts in aqueous solution with water-soluble polyvalent metal fluosilicates to form a water-insoluble alkali metal fluosilicate and a water-insoluble polyvalent metal salt, and forming said water-insoluble alkali metal fluosilicate and water-insoluble polyvalent metal salt in situ in said coating composition.

6. The process of claim 5 wherein the polyvalent metal fluosilicate is magnesium fluosilicate and the dispersed phase of the emulsion is asphalt.

7. The process of claim 5 wherein the polyvalent metal fluosilicate is magnesium fluosilicate, the water-soluble alkali metal inorganic salt is sodium silicate and the dispersed phase of the emulsion is asphalt.

8. A non-tacky, stable, storable, flowable coating composition comprising an oil-in-water type emulsion, said oil-in-water type emulsion having as its dispersed phase 50-70% of its weight of a water-insoluble, water-dispersible organic thermoplastic material, said emulsion containing the nascent reaction products of 0.2-20% by weight of the coating composition of a polyvalent metal fluosilicate having a solubility in water greater than 1.0% at 20° C. and 1.0-12% by weight of the coating composition of a water-soluble alkali metal inorganic salt of the type which reacts in aqueous solution with a water-soluble polyvalent metal fluosilicate to form a water-insoluble alkali metal fluosilicate and a water-insoluble polyvalent metal salt.

9. The composition of claim 8 wherein the polyvalent metal fluosilicate is magnesium fluosilicate.

10. The composition of claim 8 wherein the dispersed phase of the emulsion is asphalt.

11. A non-tacky, stable, storable, flowable coating composition comprising an oil-in-water type emulsion, said oil-in-water type emulsion having as its dispersed phase 50-70% of its weight of a water-insoluble, water-dispersible organic thermoplastic material, said emulsion containing a filler and the nascent reaction products of 0.2-20% by weight of the coating composition of a polyvalent metal fluosilicate having a solubility in water greater than 1.0% at 20° C. and 1.0-12% by weight of the coating composition of a water-soluble alkali metal inorganic salt of the type which reacts in aqueous solution with a water-soluble polyvalent metal fluosilicate to form a water-insoluble alkali metal fluosilicate and a water-insoluble polyvalent metal salt.

12. The composition of claim 11 wherein the dispersed phase of the emulsion is asphalt.

13. The composition of claim 11 wherein the polyvalent metal fluosilicate is magnesium fluosilicate.

14. The composition of claim 11 wherein the polyvalent metal fluosilicate is magnesium fluosilicate; the water-soluble alkali metal inorganic salt is sodium silicate, and the dispersed phase of the emulsion is asphalt.

PAUL E. McCOY.

REFERENCES CITED

The following references are of record in the file of this patent:

UNITED STATES PATENTS

| Number | Name | Date |
|---|---|---|
| 2,033,657 | Smith | Mar. 10, 1936 |
| 2,114,692 | Ward | Apr. 19, 1938 |
| 2,200,710 | Bent | May 14, 1940 |

FOREIGN PATENTS

| Number | Country | Date |
|---|---|---|
| 543,620 | Great Britain | 1942 |